US007742043B2

(12) United States Patent
Lin et al.

(10) Patent No.: US 7,742,043 B2
(45) Date of Patent: Jun. 22, 2010

(54) SYSTEM STATUS DISPLAY MODULE AND LEVEL-SHIFT CIRCUIT THEREOF

(75) Inventors: Kuan-Ho Lin, Taipei (TW); Hsien-Chih Kuo, Taipei (TW)

(73) Assignee: Mitac International Corp., Hsinchu County (TW)

( * ) Notice: Subject to any disclaimer, the term of this patent is extended or adjusted under 35 U.S.C. 154(b) by 1027 days.

(21) Appl. No.: 11/477,391

(22) Filed: Jun. 30, 2006

(65) Prior Publication Data

US 2007/0247448 A1 Oct. 25, 2007

(30) Foreign Application Priority Data

Mar. 16, 2006 (TW) .............................. 95108901 A

(51) Int. Cl.
*G06F 3/038* (2006.01)
*G09G 5/00* (2006.01)

(52) U.S. Cl. ......................... 345/204; 345/98; 345/211; 326/68

(58) Field of Classification Search ............. 326/68–83; 327/108, 109; 345/204, 98, 211–213
See application file for complete search history.

(56) References Cited

U.S. PATENT DOCUMENTS 5,726,676 A * 3/1998 Callahan et al. ............... 345/98
6,266,040 B1 * 7/2001 Nagatomo ................... 345/98

* cited by examiner

*Primary Examiner*—Vibol Tan
*Assistant Examiner*—Crystal L Hammond
(74) *Attorney, Agent, or Firm*—Rabin & Berdo, P.C.

(57) ABSTRACT

A system status display module with a level-shift circuit thereof is provided for processing signals of system status data. The level-shift circuit includes an input circuit and an output circuit for processing plural input signals that have different voltage ranges. The input circuit includes two field effect transistors (FETs) in circuit connection with an input adjusting voltage, thereby transferring the voltage ranges of the input signals into the operation voltage range of a display controller on the module. The output circuit includes another two FETs in circuit connection with two different output adjusting voltages, thereby transferring the voltage range of an output signal transmitted from the display controller into required voltage ranges for the mother board.

20 Claims, 5 Drawing Sheets

SYSTEM STATUS DISPLAY MODULE AND LEVEL-SHIFT CIRCUIT THEREOF

BACKGROUND OF THE INVENTION

1. Field of Invention

The present invention relates to a level-shift circuit, and more particularly to a system status display module and a level-shift circuit thereof that transforms the different voltage ranges of plural system status signals.

2. Related Art

The status data of computer system allows a engineer to know the current status of the BIOS (Basic Input/Output System), the CPU (Central Processing Unit), the system memory, the operation of the mother board, the power supply, the input/output devices and the peripherals. Generally, a signal cable is used to output various system status signals from the mother board to a system status display module, such as a LCD (Liquid Crystal Display) to display the system status.

In the prior art, the mother boards usually have different designs for the signal sources and transmission paths of the system status data. What more complex is that the system status signals have different operating voltage ranges. If the signal status signals have different voltage ranges from the operating voltage of the display controller of the system status display module, the display will possibly make error identifications on the logic high/low of the system status signals, and thereby displaying the wrong data. For example, a system status signal S1 sourced from a South Bridge or an I/O controller (such as a Super I/O controller) has a voltage range of 0~5 V, while another system status signal S2 transmitted through a COM port (communication port) controller has a raised voltage range of −12~12V. Then, if a display controller of the system status display module has an operating voltage range of 0~5 V, the display controller will possibly read and display the −12~12V system status signal S2 in a totally opposite way. Actually, even the signal source is the same, inappropriate voltage ranges of the system status signals lead to different reading results.

However, there is no appropriate solution that can be applied to different mother boards for displaying system status, or allow the system status display module to read and display the system status signals with different voltage ranges from different mother boards or different system components.

SUMMARY OF THE INVENTION

To solve the technical problem existing in the prior art, the present invention provides a level-shift circuit for a system status display module. The level-shift circuit is utilized to process at least two system status signals transmitted/received to/from the system status display module. Therefore, both a system status signal source on a mother board and a display controller of the system status display module may identify the system status signals correctly.

In an embodiment of the present invention, a system status display module is provided for processing a first input signal and a second input signal. The first input signal and the second input signal are transmitted directly/indirectly from a system status signal source of a mother board for displaying a plurality of system status data of the mother board. The system status display module includes a display controller, a level-shift circuit, a power connector, a signal connector and a display panel.

In an embodiment of the present invention, the level-shift circuit includes an input circuit and an output circuit. The input circuit has a first FET and a second FET in circuit connection with an input adjusting voltage respectively, thereby transforming a first voltage range of the first input signal or a second voltage range of the second input signal into an operating voltage range of the display controller. The output circuit has a third FET and a fourth FET in circuit connection with a first output adjusting voltage and a second output adjusting voltage, thereby transforming an output signal of the display controller into the first output signal with the first voltage range or the second output signal with the second voltage range.

In an embodiment of the present invention, the power connector is equipped for transmitting the input adjusting voltage, the first output adjusting voltage and the second output adjusting voltage from the mother board. The signal connector is in circuit connection with the mother board, transmitting the first input signal, the second input signal, the first output signal and the second output signal. And the display panel is for displaying the system status data.

In an embodiment of the present invention, the system status display module further includes a first jumper switch and a second jumper switch. The first jumper switch is in circuit connection with the input circuit and the display controller. The second jumper switch is in circuit connection with the output circuit and the signal connector.

In an embodiment of the present invention, the gate of the first FET receives the first input signal or the second input signal; the source of the first FET is grounded; and the drain of the first FET is in circuit connection with the input adjusting voltage, thereby providing a second process signal with the operating voltage range of the display controller to the display controller. Furthermore, the gate of the second FET is in circuit connection with the drain of the first FET and the input adjusting voltage; the source of the second FET is grounded; and the drain of the second FET is in circuit connection with the input adjusting voltage, thereby providing a first process signal with the operating voltage range of the display controller to the display controller. In addition, the gate of the third FET receives the output signal with the operating voltage range of the display controller; the source of the third FET is rounded; and the drain of the third FET is in circuit connection with the first output adjusting voltage, thereby generating the second output signal with the second voltage ranges. Moreover, the gate of the fourth FET is in circuit connection with the drain of the third FET and the first output adjusting voltage; the source of the fourth FET is grounded; and the drain of the fourth FET is in circuit connection with the second output adjusting voltage, thereby generating the first output signal with the first voltage range.

In an embodiment of the present invention, the second input signal is transmitted via a COM-port controller of the mother board to the input circuit, while the second output signal is transmitted through the COM-port controller to the system status signal source. And the voltage range of the first output adjusting voltage equals to the operating voltage range of the COM-port controller. Besides, the voltage range of the input adjusting voltage equals to the operating voltage range of the display controller or the system voltage range of the mother board. Additionally, the voltage range of the second output adjusting voltage equals to the operating voltage range of the system status signal source or the system voltage range of the mother board.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

Figure 1:
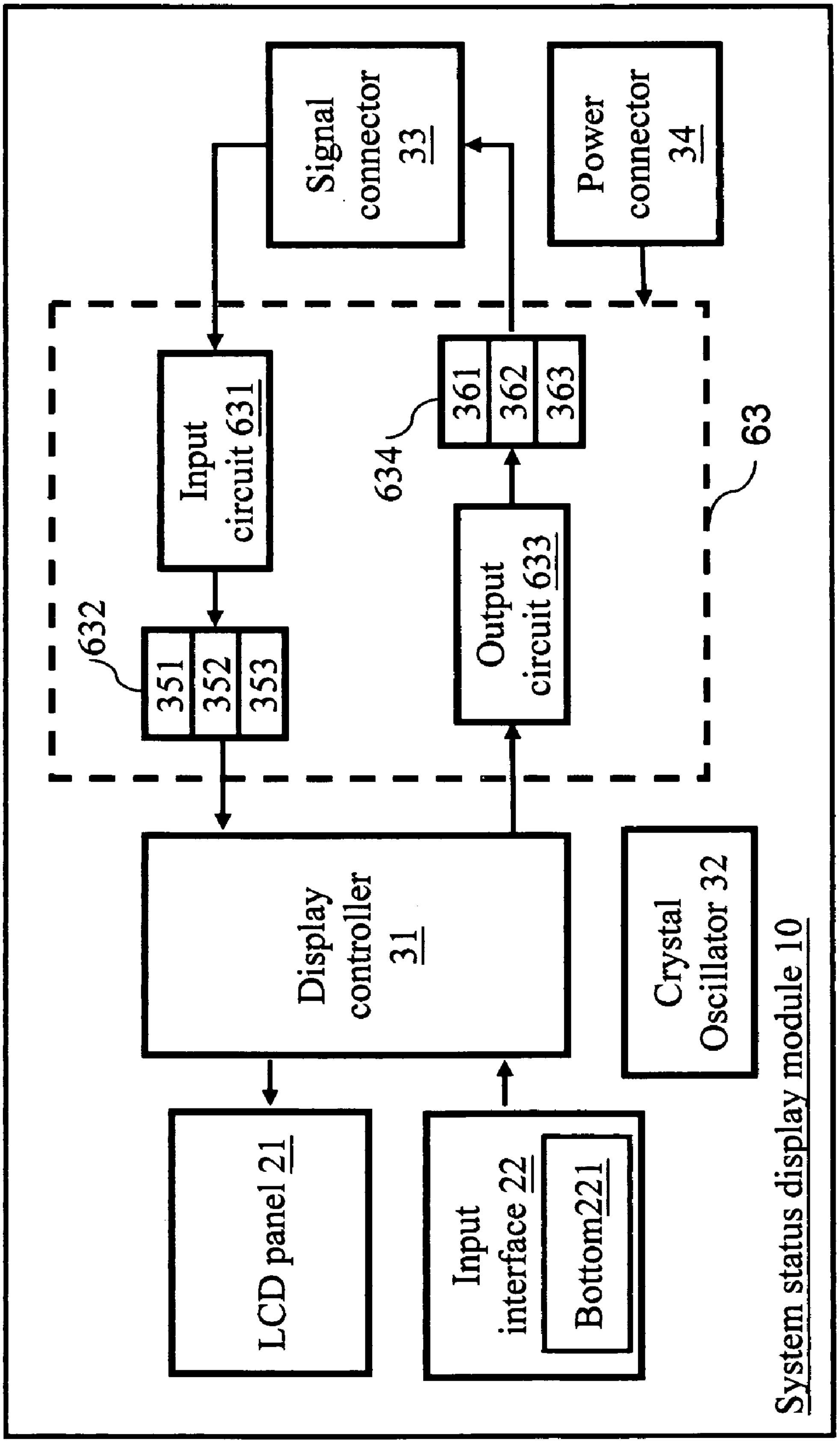
FIG. 1 shows a block diagram of a system status display module according to an embodiment of the present invention.

Please refer to FIG. 1, which shows a block diagram of a system status display module according to an embodiment of the present invention. The system status display module 10 includes a display panel 21, an input interface 22, a display controller 31, a crystal oscillator 32, a signal connector 33, a power connector 34 and a level-shift circuit 63. The display panel 21 displays the system status read by the display controller 31. The input interface 22 includes plural bottoms 221 representing various commands of display operation. A user may use the bottoms 221 to input commands to the system status display module 10 to display different types of the system status data or to control the system status display module 10.

Figure 5:
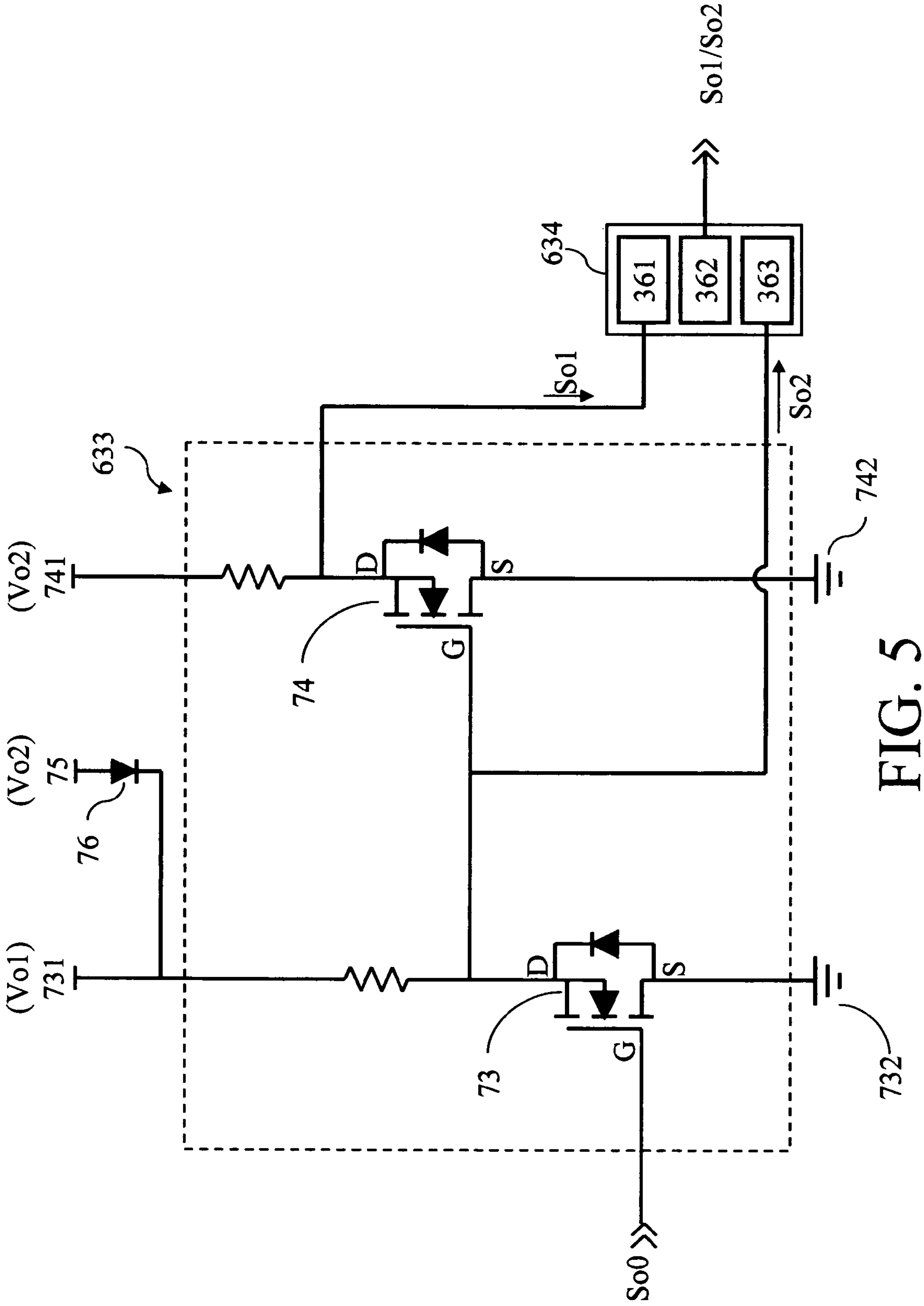
FIG. 5 shows an output circuit according to another embodiment of the present invention.

The level-shift circuit 63 includes a first jumper switch (jumper switch) 632 and a second jumper switch 634 for different two signal sources with different voltage ranges. The first jumper switch 632 has a first pin 351, a second pin 352 and a third pin 353; the second jumper switch 634 has a first pin 341, a second pin 362, a third pin 363. The system status display module 10 utilizes the level-shift circuit 63 to transform the voltage levels of the system status signals for the display controller 31, to enable the display controller 31 to correctly identify and display the system status data. The crystal oscillator 32 is for generating a stable operating clock to the whole the system status display module 10. The signal connector 33 connects the system status display module 10 and the mother board 40 (FIG. 5). In the present invention, what input to the power connector 34 is the power source of the mother board 40. Generally, the voltages provides by the power source may includes the system voltage (the operation voltage of the mother board), the CPU voltage (dedicated to CPU) or other specific voltages. Certain voltages may be input to the system status display module 10. The first jumper switch 632 and the second jumper switch 634 are for switching the transmitting path according the generating source and the voltage ranges of the system status signals.

The related circuits of the embodiments according to the present invention are described in detail as follows, accompanying with FIGS. 2~4.

Figure 2:
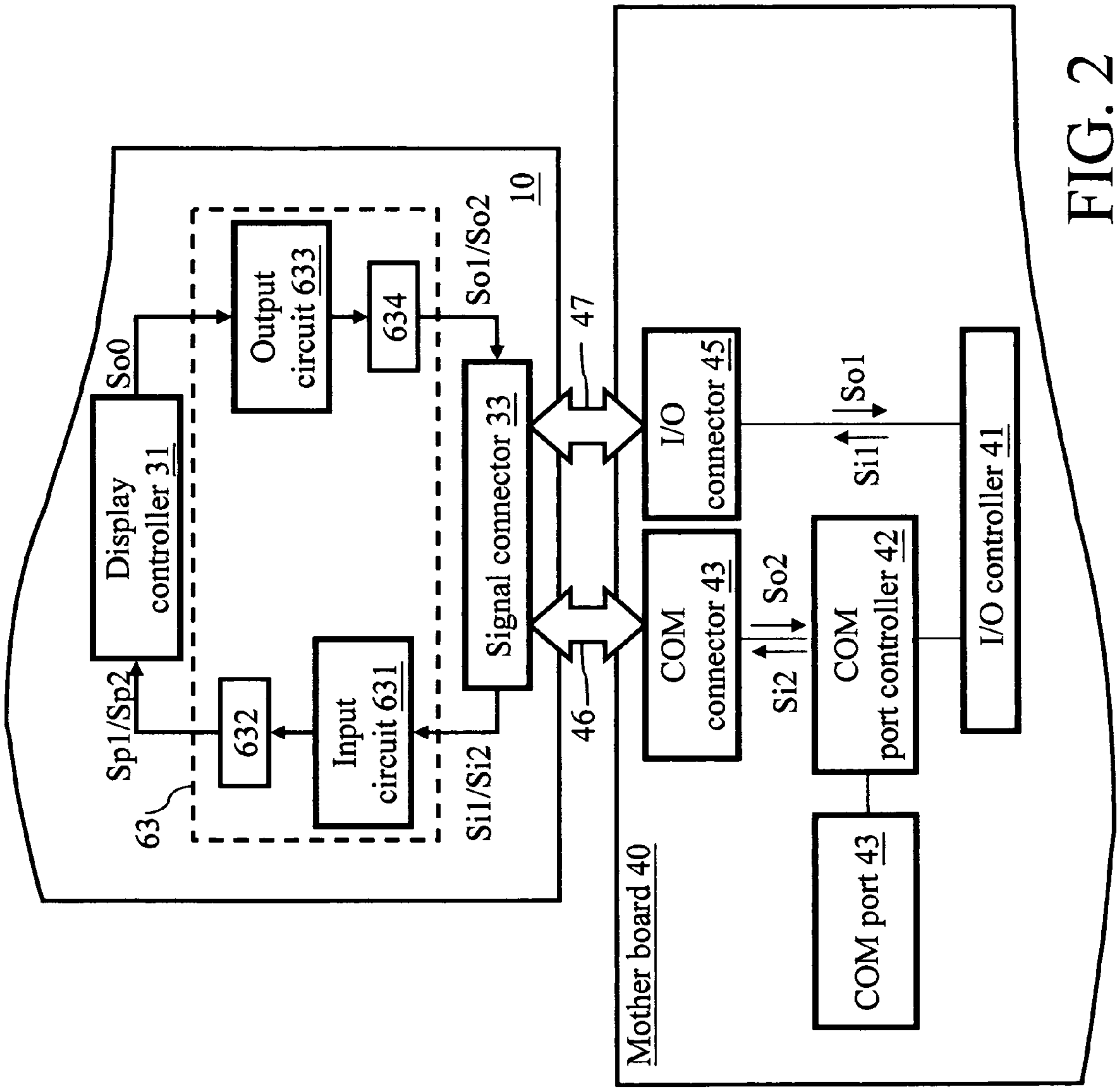
FIG. 2 is a block diagram about the major elements of the mother board and the system status display module according to an embodiment of the present invention.

FIG. 2 is a block diagram about the major elements of the mother board and the system status display module according to an embodiment of the present invention. For the convenience of explanation, only the significant elements of the system status display module 10 and the mother board 40 are shown. The level-shift circuit 63 includes an input circuit 631, a output circuit 633, the first jumper switch 632 and the second jumper switch 634. The I/O (input/output) controller 41 configured on the mother board 40 transmits/receives the system status signals to/from the system status display module 10 under the commands of the BIOS. In the embodiments of the present invention, the I/O controller 41 transmits the system status signal through two transmitting paths: one passing through a COM-port (communication port) controller 42, a COM (communication) connector 43 and a signal cable 46 to the signal connector 33 of the system status display module 10, the other one transmitting through the I/O connector 45 and the signal cable 47 to the signal connector 33. Practically, only one of the two transmitting paths will possibly be utilized on the mother board 40. But the level-shift circuit 63 according to the present invention is applicable to both the transmitting paths.

In general, the I/O controller 45 (such as a floppy disk controller) transmits signals of 0~5V. Since COM-port 44 (such as RS232 communication port) off-board transmission needs higher driven voltage, the second input signal Si2 is transformed by the COM-port controller 42 from 0~5V (the first voltage ranges) to −12~12V (the second voltage range) before transmitted to the COM-port 44 or the COM connector 43. Therefore, it is the −12~12V second input signal Si2 that passes through the COM connector 43 and the signal cable 46. The first input signal Si1 that passes through the I/O connector 45 and the signal cable 47 is not transformed and remains 0~5V. Generally, the display controller 31 correctly identifies the logic level of the system status signals only when the voltage range is under its operating voltage (such as 0~5V). If the signal connector 33 receives the second input signal Si2, the level-shift circuit 63 will have to be utilized to transform the second input signal Si2 to 0~5V for the correct identification of the display controller 31. Afterwards, a 0~5V output signal will be generated from the display controller 31 and fed back the I/O controller 41. Then the level-shift circuit 63 will be used again to transform the 0~5V output signal back to −12~12V for transmitting along the same communication path.

Furthermore, to allow the system status signals with various voltage ranges to use the same level-shift circuit 63, both the input circuit 631 and the output circuit 633 must be capable of processing 5V- and 12-V signals. Meanwhile, except the level-shift operation of the system status signals, further concerns are about the logic-level inversion operation of the signals according to the components used in real situations. For instance, in the embodiment the signals transmitted from the display controller 31 and the I/O controller 41 have the same logic level, but opposite to the one through the COM-port controller 42.

Figure 3:
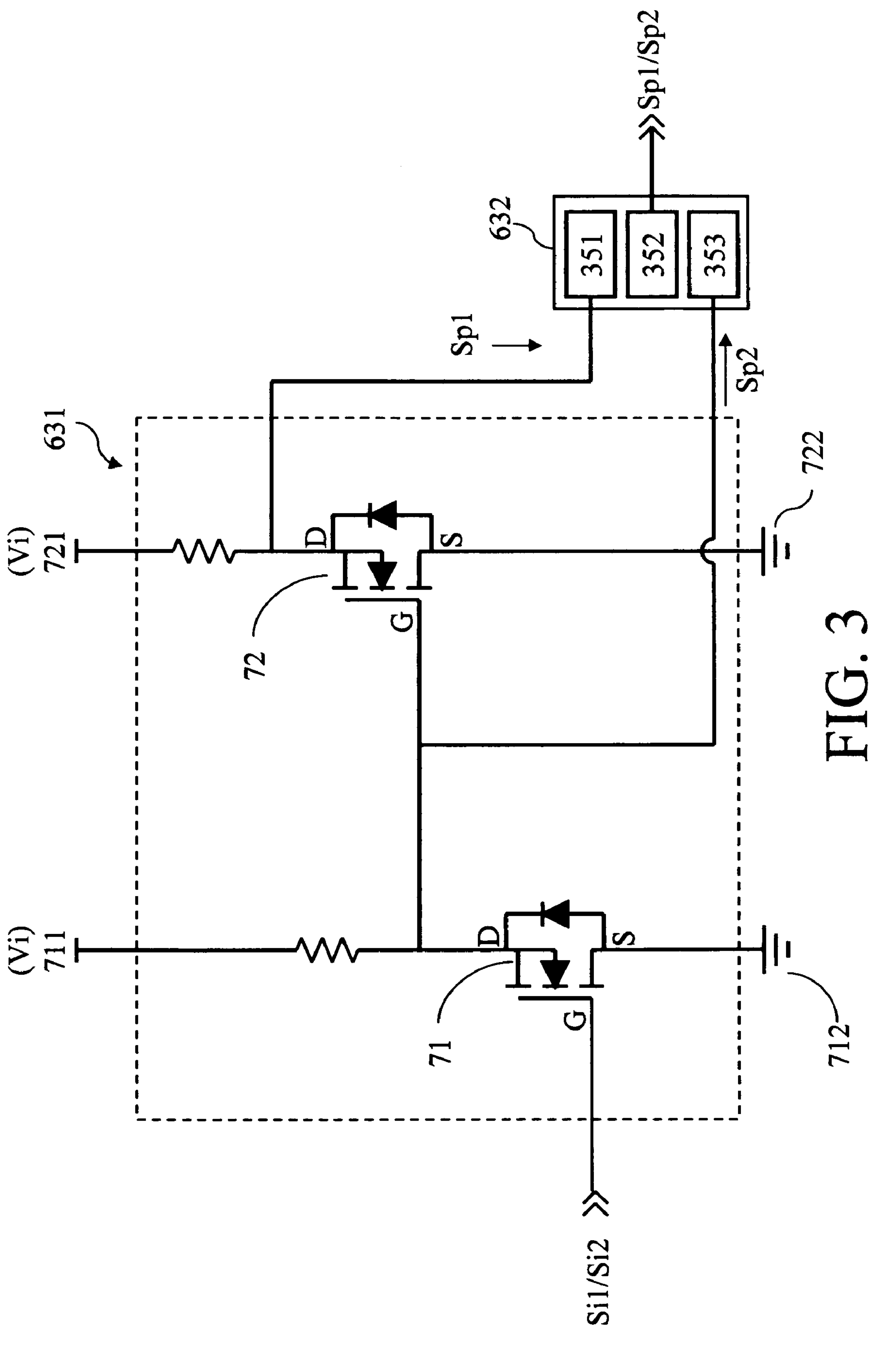
FIG. 3 shows an input circuit of an embodiment according to the present invention.

FIG. 3 discloses an input circuit of an embodiment according to the present invention. The input circuit 631 mainly includes a first FET (Field Effect Transistor) 71 and a second FET 72, which may be both realized by NMOS (N-Channel Metal Oxide Semiconductor).

The gate of the first FET 71 receives an input signal transmitted from the I/O controller 41, via the signal connector 33 to the system status display module 10; wherein the input signal may be the first input signal Si1 with 0~5V (the first voltage range) directly from the I/O connector 45, or the second input signal Si2 with −12~12 V (the second voltage range) from the COM connector 43. The source of the first FET 71 electrically connects to a first ground 712, while its drain is in circuit connection with a first voltage 711, the gate of the second FET 72 and the third pin 353 of the first jumper switch 632. The source of the second FET 72 electrically connects a second ground 722, while the drain of the second FET 72 is in circuit connection with a second voltage 721 and the first pin 351 of the first jumper switch 632. The first voltage 711 and the second voltage 721 are provided for inputting an input adjusting voltage Vi. According to the voltage ranges of the input signal, the user may use jumpers to connect the first, second pins 351, 352 of the first jumper switch 632, or connect the second, third pins 352, 353. That means, the system status signals passing through the first pin 351 or the third pin 353 of the first jumper switch 632, may be selectively transmitted via the second pin 352 to the display controller 31, and eventually displayed by the display panel 21.

No matter the first input signal Si1 with the first voltage range or the second input signal Si2 with the second voltage range is input from the signal sources to the input circuit 631, a first process signal Sp1 output through the first pin 351 or a second process signal Sp2 output through the third pin 353 will have a voltage range match the operating voltage range of the display controller 31. Then, the display controller 31 can possibly read the logic levels of the first process signal Sp1 or the second process signal Sp2 and identify as correct results.

The selection of the voltage range of the input adjusting voltage Vi is directly related to the operating voltage range of the display controller 31. In some situations, the voltage range of the input adjusting voltage Vi may equal to the operating voltage range of the display controller 31, or the system voltage range (the major operating voltage range used on the mother board 40). Since the operating voltage range of the display controller 31 is 0~5V, very close to the system voltage range, the first voltage 711 and the second voltage 721 may be provided by the system voltage.

When the first input signal Si1 is input to the first FET 71, the first and second pins 351, 352 of the first jumper switch 632 need to be connected by a jumper in advance.

If the first input signal Si1 with the 0~5 voltage range is at logic high, the drain of the first FET 71 will be grounded; and the gate of the second FET 72 will become logic low. Thus, the voltage range of the first process signal Sp1 will depend on the second adjusting voltage 721 (the input adjusting voltage Vi). In the embodiment, the input 5V system voltage will make the voltage of the first process signal Sp1 at logic high close to but less than 5V, matching the demands of the operating voltage range of the display controller 31. And the first process signal Sp1 will has the same logic level (high) as the first input signal Si1.

If the first input signal Si1 is at logic low, then the drain of the first FET 71 will not be grounded; and the voltage values at the gate of the second FET 72 will depend on the input adjusting voltage Vi of the first voltage 721. In the embodiment, the input 5V system voltage will make the drain of the second FET 72 grounded to enable the first process signal Sp1 a 0V for its logic low, matching the demands of the operating voltage range of the display controller 31. And the first process signal Sp1 will has the same logic level (low) as the first input signal Si1.

When the second input signal Si2 is input to the first FET 71, the second and third pins 352, 353 of the first jumper switch 632 will need to be connected by a jumper.

If the second input signal Si2 is at logic high, the drain of the first FET 71 will be grounded to enable the second process signal Sp2 a logic low. Then, the second process signal Sp2 will have 0V for its logic low, matching the demands of the operating voltage range of the display controller 31. The second process signal Sp2 will be at logic low, opposite to the logic level of the second input signal Si2.

If the second input signal Si2 is at logic low, the first FET 71 is not grounded; then the second process signal Sp2 will have its voltage values depend on the first adjusting voltage 711 (the input adjusting voltage Vi). In the embodiment, the input 5V system voltage will enable the logic high level of the second process signal Sp2 close to but less than 5 V, which matches the demands of the operating voltage of the display controller 31 to read correct results. Furthermore, the second process signal Sp2 is at logic high, opposite to the second input signal Si2.

Eventually, the embodiment provides the level-shift circuit 63 to allow the first input signal Si1 with the first voltage range or the second input signal Si2 with the second voltage range input therein, and further to transform the input signals to the first process signal Sp1 or the second process signal Sp2 that has the operating voltage range.

Figure 4:
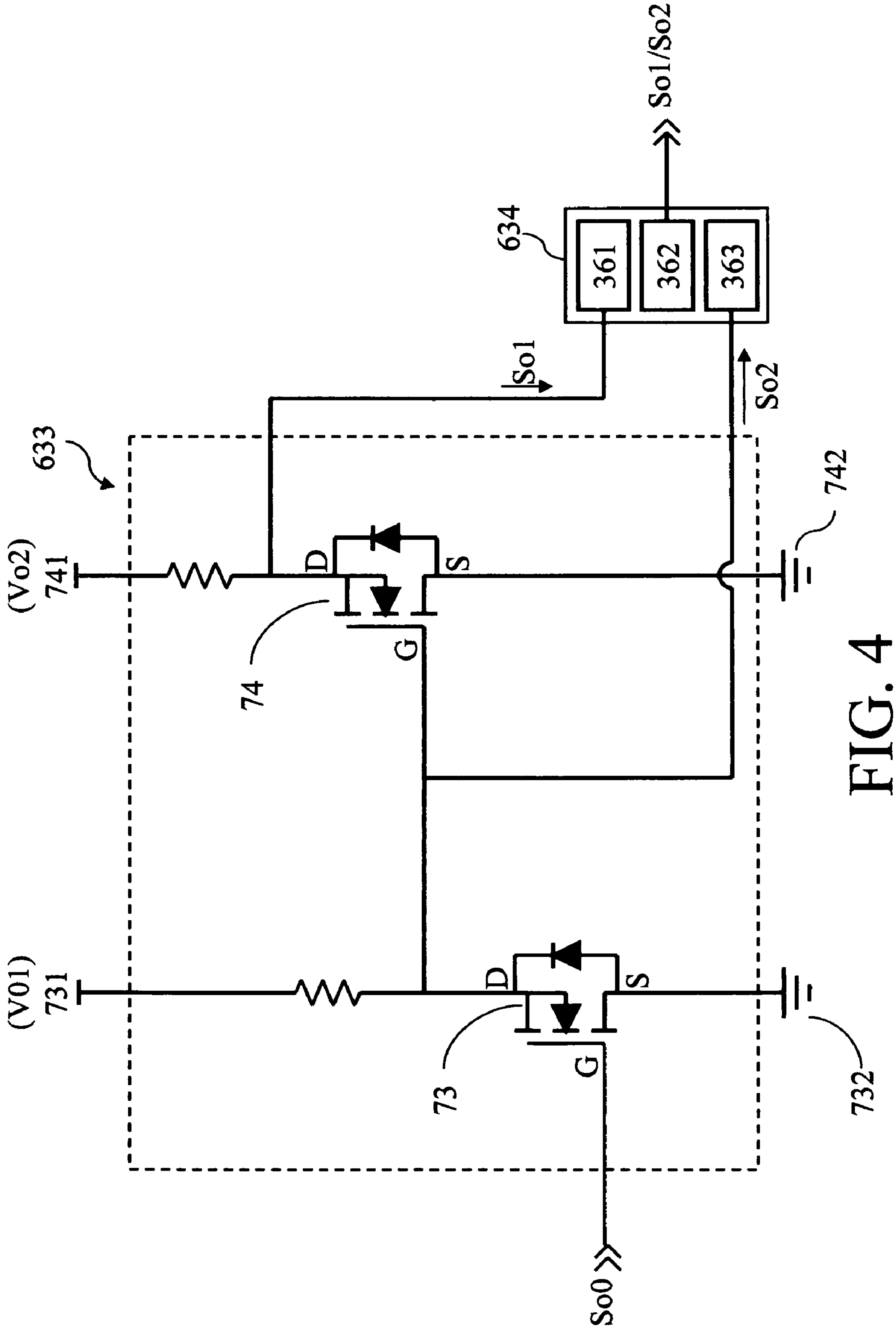
FIG. 4 shows an output circuit according to an embodiment of the present invention.

FIG. 4 discloses an output circuit according to another embodiment of the present invention. The output circuit 633 mainly includes a third FET 73 and a fourth FET 74, both may be realized as an NMOS. The gate of the third FET 73 receives a output signal Sop generated from the display controller 31, while the source connects the third ground 732, and its drain is in circuit connection with the third voltage 731, the gate of the fourth FET 74 and the third pin 363 of the second jumper switch 634. The source of the fourth FET 74 connects to the fourth ground 742, while its drain is in circuit connection with the fourth adjusting voltage 741 and the first pin 361 of the second jumper switch 634. The second pin 362 of the second jumper switch 634 will be connected to the signal connector 33 (FIGS. 1 and 2). Eventually, the generated first output signal So1 and second output signal So2 may be selectively transmitted to the signal connector 33, and then directly/indirectly transmitted to the I/O controller 41 of the mother board 40 (FIG. 2).

The output circuit 633 operates in the similar way as the input circuit 631, so the following description will only focus on the differences.

In FIG. 4, the third voltage 731 is provided by the first output adjusting voltage Vo1, while the fourth voltage 741 is provided by the second output adjusting voltage Vo2.

The output signal So will be processed by the output circuit 633 and become the second output signal So2 first, and then passing through the signal connector 33, the COM connector 43, the COM-port controller 42 to the I/O controller 41 in FIG. 2. So the second output signal So2 needs to use the third FET 73 and the first output adjusting voltage Vo1 to transform into the second voltage range (the same as the second input signal Si2 in FIG. 3). In the embodiment, the second voltage range is −12~12V. Therefore, the first output adjusting voltage Vo1 must follow the second voltage range. In certain cases, the voltage range of the first output adjusting voltage Vo1 equals to the second voltage range.

After the output signal So0 is processed by the output circuit 633 and become the first output signal So1, the first output signal So1 will be transmitted through the signal connector 33, the I/O connector 45 to the I/O controller 41 in FIG. 2. So the second output adjusting voltage Vo2 is utilized to transform the output signal So0 to the first voltage range (the same as the first input signal Si1 in FIG. 3). In the embodiment, the first voltage range is about 0~5V, similar to the system voltage, so the second output adjusting voltage Vo2 may be provided by the system voltage. Otherwise, the second output adjusting voltage Vo2 should be selected according to the first voltage ranges.

The input adjusting voltage Vi, the first and second output adjusting voltages Vo1, Vo2 used in the embodiments of the present invention need to be provided by the system voltage of the mother board 40 or other specific voltages provided by raised/lowered system voltage. In actual practice, the second output adjusting voltage Vo2 may possibly need specific voltage to provide. Please refer to FIG. 5; if the selection of the second output adjusting voltage Vo2 is optional, a specific voltage 75 may be provided as the second output adjusting voltage Vo2 between the third voltage 731 and the third FET 73. An additional diode 76 may be utilized to prevent from the reverse current.

The input circuit 631 and the output circuit 633 in the embodiments of the present invention are unidirectional transmitting circuits, so the first FET 71, the second FET 72, the third FET 73 and the fourth FET 74 also have the function of reverse-current prevention. In actual practice, the four FETs may use the same type transistors.

Furthermore, for actual practice, the definition of the first and second voltage ranges may depend on the COM-port controller 42 and the I/O controller 41. The first input signal Si1 is sourced from the I/O controller 42, so its first voltage range (or the second output adjusting voltage Vo2) may follow the operating voltage range of the I/O controller 42. The second input signal Si2 is generated/received from/by the COM-port controller 42, so it should follow the operating voltage range of the COM-port controller 42. Even though there are other system status signals with various voltage ranges, and transmitted via different paths to the system status display module 10, the level-shift circuit according to the present invention may still be applicable for processing.

Besides, the transmitting/receiving procedures of the system status signal may executed by a single system status signal source of the mother board; which means, except the I/O controller, the system status data may possibly provided by other active components equipped on the mother board, such as the south bridge or an input/output hub.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A level-shift circuit for processing a first input signal, a second input signal and an output signal, the first input signal and the second input signal being transmitted directly/indirectly from a system status signal source of a mother board to a display controller of a system status display module, the output signal being transmitted from the display controller to the system status signal source, the level-shift circuit comprising:

an input circuit having a first FET (Field Effect Transistor) and a second FET in circuit connection with an input adjusting voltage respectively, thereby transforming a first voltage range of the first input signal and a second voltage range of the second input signal into the operating voltage range of the display controller; and an output circuit having a third FET and a fourth FET in circuit connection with a first output adjusting voltage and a second output adjusting voltage respectively, thereby transforming the output signal with the operating voltage range into a first output signal with the first voltage range or into a second output signal with the second voltage range.

2. The level-shift circuit of claim 1, wherein the gate of the first FET receives the first input signal or the second input signal, the source of the first FET is grounded, and the drain of the first FET is in circuit connection with the input adjusting voltage, thereby providing a second process signal with the operating voltage range of the display controller to the display controller.

3. The level-shift circuit of claim 2, wherein the gate of the second FET is in circuit connection with the drain of the first FET and the input adjusting voltage, the source of the second FET is grounded, and the drain of the second FET is in circuit connection with the input adjusting voltage, thereby providing a first process signal with the operating voltage range of the display controller to the display controller.

4. The level-shift circuit of claim 1, wherein the gate of the third FET receives the output signal with the operating voltage range of the display controller, the source of the third FET is rounded, and the drain of the third FET is in circuit connection with the first output adjusting voltage, thereby generating the second output signal with the second voltage ranges.

5. The level-shift circuit of claim 4, wherein the gate of the fourth FET is in circuit connection with the drain of the third FET and the first output adjusting voltage, the source of the fourth FET is grounded, and the drain of the fourth FET is in circuit connection with the second output adjusting voltage, thereby generating the first output signal with the first voltage range.

6. The level-shift circuit of claim 1, wherein the second input signal is transmitted via a COM-port controller of the mother board to the input circuit, and the second output signal is transmitted through the COM-port controller to the system status signal source.

7. The level-shift circuit of claim 6, wherein the voltage range of the first output adjusting voltage equals to the operating voltage range of the COM-port controller.

8. The level-shift circuit of claim 1, wherein the voltage range of the input adjusting voltage equals to the operating voltage range of the display controller or the system voltage range of the mother board.

9. The level-shift circuit of claim 1, wherein the voltage range of the second output adjusting voltage equals to the operating voltage range of the system status signal source or the system voltage range of the mother board.

10. The level-shift circuit of claim 1, wherein the third FET is in circuit connection with a diode and a specific voltage.

11. A system status display module for processing a first input signal and a second input signal transmitted directly/indirectly from a system status signal source of a mother board for displaying a plurality of system status data of the mother board, the system status display module comprising:

a display controller;

a level-shift circuit, comprising:

an input circuit having a first FET and a second FET in circuit connection with an input adjusting voltage respectively, thereby transforming a first voltage range of the first input signal or a second voltage range of the second input signal into an operating voltage range of the display controller; and an output circuit having a third FET and a fourth FET in circuit connection with a first output adjusting voltage and a second output adjusting voltage, thereby transforming an output signal of the display controller into the first output signal with the first voltage range or the second output signal with the second voltage range;

a power connector for transmitting the input adjusting voltage, the first output adjusting voltage and the second output adjusting voltage from the mother board;

a signal connector in circuit connection with the mother board, transmitting the first input signal, the second input signal, the first output signal and the second output signal; and a display panel for displaying the system status data.

12. The system status display module of claim 11, wherein the gate of the first FET receives the first input signal or the second input signal, the source of the first FET is grounded, and the drain of the first FET is in circuit connection with the input adjusting voltage, thereby providing a second process signal with the operating voltage range of the display controller to the display controller.

13. The system status display module of claim 12, wherein the gate of the second FET is in circuit connection with the drain of the first FET and the input adjusting voltage, the source of the second FET is grounded, and the drain of the second FET is in circuit connection with the input adjusting voltage, thereby providing a first process signal with the operating voltage range of the display controller to the display controller.

14. The system status display module of claim 11, wherein the gate of the third FET receives the output signal with the operating voltage range of the display controller, the source of the third FET is rounded, and the drain of the third FET is in circuit connection with the first output adjusting voltage, thereby generating the second output signal with the second voltage ranges.

15. The system status display module of claim 14, wherein the gate of the fourth FET is in circuit connection with the drain of the third FET and the first output adjusting voltage, the source of the fourth FET is grounded, and the drain of the fourth FET is in circuit connection with the second output adjusting voltage, thereby generating the first output signal with the first voltage range.

16. The system status display module of claim 11, wherein the second input signal is transmitted via a COM-port controller of the mother board to the input circuit, and the second output signal is transmitted through the COM-port controller to the system status signal source, and the voltage range of the first output adjusting voltage equals to the operating voltage range of the COM-port controller.

17. The system status display module of claim 11, wherein the voltage range of the input adjusting voltage equals to the operating voltage range of the display controller or the system voltage range of the mother board.

18. The system status display module of claim 11, wherein the voltage range of the second output adjusting voltage equals to the operating voltage range of the system status signal source or the system voltage range of the mother board.

19. The system status display module of claim 11, further comprising a first jumper switch in circuit connection with the input circuit and the display controller.

20. The system status display module of claim 11, further comprising a second jumper switch in circuit connection with the output circuit and the signal connector.

* * * * *